United States Patent
Barnwell et al.

(10) Patent No.: US 9,692,071 B2
(45) Date of Patent: Jun. 27, 2017

(54) MEMBRANE STRUCTURE

(75) Inventors: David Edward Barnwell, Highworth (GB); Peter Antony Trew, Devizes (GB); Thomas Robertson Ralph, Chippenham (GB); Robert Jeffrey Coleman, Purton (GB)

(73) Assignee: JOHNSON MATTHEY FUEL CELLS LIMITED, London (GB)

( * ) Notice: Subject to any disclaimer, the term of this patent is extended or adjusted under 35 U.S.C. 154(b) by 568 days.

(21) Appl. No.: 13/814,138

(22) PCT Filed: Jul. 21, 2011

(86) PCT No.: PCT/GB2011/051385
§ 371 (c)(1),
(2), (4) Date: May 14, 2013

(87) PCT Pub. No.: WO2012/017225
PCT Pub. Date: Feb. 9, 2012

(65) Prior Publication Data
US 2013/0224623 A1    Aug. 29, 2013

(30) Foreign Application Priority Data
Aug. 3, 2010 (GB) .................................. 1012980.7

(51) Int. Cl.
*H01M 2/08* (2006.01)
*H01M 8/1018* (2016.01)
(Continued)

(52) U.S. Cl.
CPC ....... *H01M 8/1018* (2013.01); *H01M 8/0273* (2013.01); *H01M 8/1004* (2013.01); *H01M 4/881* (2013.01); *H01M 8/0284* (2013.01)

(58) Field of Classification Search
CPC .. H01M 4/881; H01M 8/0273; H01M 8/0284; H01M 8/0271; H01M 8/1004; H01M 8/1018; Y02E 60/521
(Continued)

(56) References Cited

U.S. PATENT DOCUMENTS 5,264,299 A    11/1993    Krasij et al.
5,318,863 A    6/1994    Dhar
(Continued)

FOREIGN PATENT DOCUMENTS

EP    0 814 897 B1    1/1998
JP    H07-501417 A    2/1995
(Continued)

OTHER PUBLICATIONS

International Search Report dated Nov. 25, 2011, from PCT International Application No. PCT/GB2011/051385.
(Continued)

*Primary Examiner* — Patrick Ryan
*Assistant Examiner* — Ben Lewis
(74) *Attorney, Agent, or Firm* — Young & Thompson

(57) ABSTRACT

A membrane, suitable for use in a fuel cell comprises:
(a) a central region comprising an ion-conducting polymeric material;
(b) a border region which creates a frame around the central region and which consists of one or more non-ion-conducting materials wherein at least one of the one or more non-ion-conducting materials forms a layer;
wherein the non-ion-conducting material of the border region overlaps the ion-conducting polymeric material of the central region by 0 to 10 mm in an overlap region.

19 Claims, 3 Drawing Sheets

Membrane of the Invention

(51) Int. Cl.
*H01M 8/0273* (2016.01)
*H01M 8/1004* (2016.01)
*H01M 4/88* (2006.01)
*H01M 8/0284* (2016.01)

(58) Field of Classification Search
USPC ............. 429/460, 465, 483, 492, 508, 510
See application file for complete search history.

(56) References Cited

U.S. PATENT DOCUMENTS

| | | | |
|---|---|---|---|
| 5,599,614 | A | 2/1997 | Bahar et al. |
| 6,110,330 | A | 8/2000 | Lin et al. |
| 6,159,628 | A | 12/2000 | Grasso et al. |
| 6,254,978 | B1 | 7/2001 | Bahar et al. |
| 2002/0100681 | A1 | 8/2002 | Kirk et al. |
| 2004/0170883 | A1 | 9/2004 | Bartholomeyzik et al. |
| 2004/0191604 | A1* | 9/2004 | Artibise et al. ..... H01M 8/0276 429/483 |
| 2006/0099486 | A1 | 5/2006 | Sompalli et al. |
| 2006/0199062 | A1* | 9/2006 | Yanagita et al. ............. 429/33 |
| 2007/0134538 | A1* | 6/2007 | Yuichi et al. ....... H01M 8/0273 429/482 |
| 2007/0298302 | A1* | 12/2007 | Oschmann .......... H01M 8/0271 429/483 |
| 2008/0107927 | A1 | 5/2008 | Pettit et al. |
| 2009/0004543 | A1 | 1/2009 | Jung et al. |
| 2009/0087713 | A1 | 4/2009 | Yoshida et al. |

FOREIGN PATENT DOCUMENTS

| | | | | |
|---|---|---|---|---|
| JP | H11-501964 | | 2/1999 | |
| JP | 2007-42348 | | 2/2007 | |
| JP | 2007-042348 | * | 2/2007 | ............. H01M 8/02 |
| JP | 2008-117775 | | 5/2008 | |
| JP | 2009-081115 A | | 4/2009 | |
| JP | 2009-099538 A | | 5/2009 | |
| JP | 2010-61947 | | 3/2010 | |
| JP | 2010-510624 | | 4/2010 | |
| JP | 2010-225495 A | | 10/2010 | |
| JP | 2011-065876 A | | 3/2011 | |
| WO | 92/22096 | | 12/1992 | |
| WO | WO-92/22096 A2 | | 12/1992 | |
| WO | WO-00/10216 A1 | | 2/2000 | |
| WO | WO-00/26975 | | 5/2000 | |
| WO | WO-02/093669 A2 | | 11/2002 | |
| WO | WO-2004/034501 A2 | | 4/2004 | |
| WO | WO-2004/114451 A1 | | 12/2004 | |
| WO | 2008-063399 | | 5/2008 | |
| WO | WO-2009/040571 A1 | | 4/2009 | |
| WO | WO-2009/109780 A1 | | 9/2009 | |

OTHER PUBLICATIONS

British Search Report dated Sep. 28, 2010, from British Application No. 1012980.7.
JP Office Action, dated Dec. 1, 2015; Application No. 2013-522301.
Japanese Preliminary Examination Report 2013-522301 dated Jul. 1, 2016.

* cited by examiner

Figure 1: Membrane of the Invention
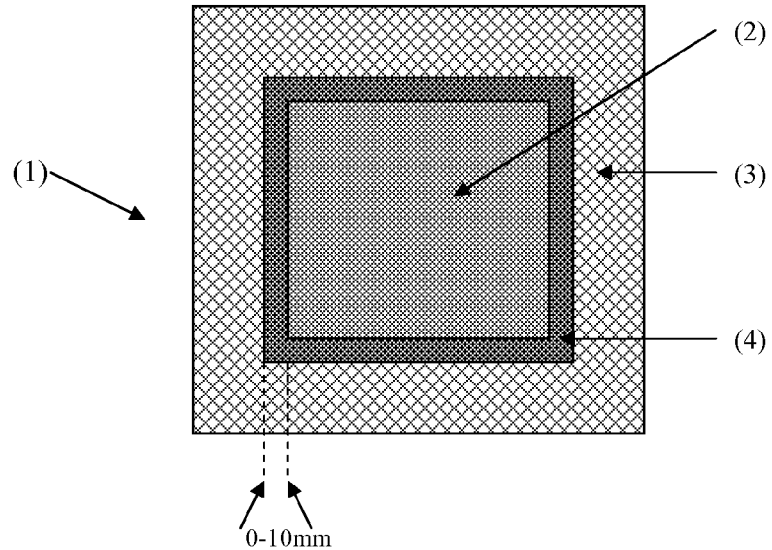
Figure 2a
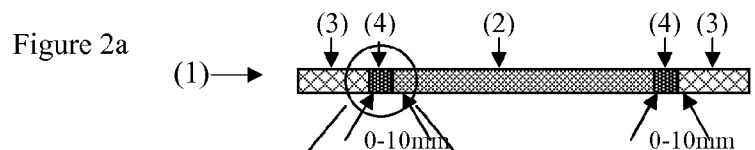
Figure 2b
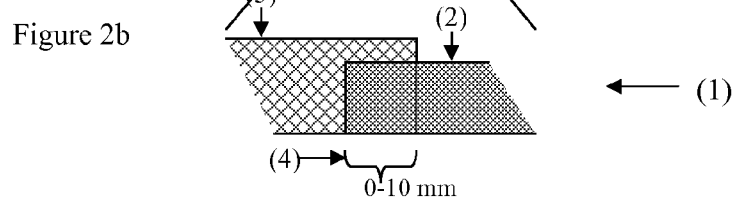
Figure 2c
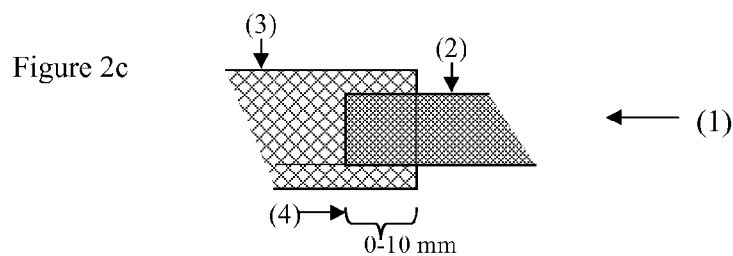
Figure 2d
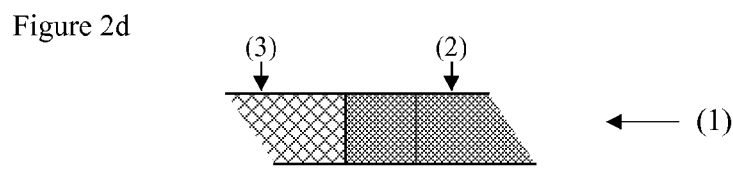

MEMBRANE STRUCTURE

CROSS-REFERENCE TO RELATED APPLICATIONS

This application is the U.S. National Phase application of PCT International Application No. PCT/GB2011/051385, filed Jul. 21, 2011, and claims priority of British Patent Application No. 1012980.7, filed Aug. 3, 2010, the disclosures of both of which are incorporated herein by reference in their entireties for all purposes.

FIELD OF THE INVENTION

The present invention relates to a membrane, and in particular to a membrane suitable for use in a fuel cell.

BACKGROUND OF THE INVENTION

A fuel cell is an electrochemical cell comprising two electrodes separated by an electrolyte. A fuel, such as hydrogen or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In proton exchange membrane (PEM) fuel cells, the electrolyte is a solid polymeric membrane. The membrane is electronically insulating but ionically conducting. In the PEM fuel cell the membrane is proton conducting, and protons, produced at the anode, are transported across the membrane to the cathode, where they combine with oxygen to form water.

The principle component of a PEM fuel cell is known as a membrane electrode assembly (MEA) and is essentially composed of five layers. The central layer is the polymeric ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Conventionally, the MEA is constructed so that the central polymeric ion-conducting membrane extends to the edge of the MEA, with the gas diffusion layers and electrocatalyst layers being smaller in area than the membrane such that there is an area around the periphery of the MEA which comprises ion-conducting membrane only. The area where no electrocatalyst is present is a non-electrochemically active region. Film layers, typically formed from non-ion conducting polymers, are generally positioned around the edge region of the MEA on the exposed surfaces of the ion-conducting membrane where no electrocatalyst is present to seal and/or reinforce the edge of the MEA. An adhesive layer may be present on one or both surfaces of the film layer.

Therefore, much of the polymeric ion conducting material used in the membrane extends beyond the electrochemically active region into a non-electrochemically active region, often by up to several centimeters. In low geometric area MEAs this non-electrochemically active region can contribute to as much as 50% of the entire MEA geometric area. The membrane which extends beyond the electrochemically active area does not contribute to the activity and performance.

SUMMARY OF THE INVENTION

It is the object of the present invention to provide a lower cost membrane, in particular a membrane for a fuel cell, which suitably has increased durability and dimensional stability over the state-of-the-art membranes. It is a further object to provide a membrane which demonstrates improved performance when incorporated into an MEA. The polymeric ion-conducting membrane is one of the most costly components in the fuel cell, and it is desirable to reduce the cost of these fuel cells to increase their commercial viability.

Accordingly, the present invention provides a membrane, suitable for use in a fuel cell, wherein the membrane comprises:
(a) a central region comprising an ion-conducting polymeric material;
(b) a border region which creates a frame around the central region and which consists of one or more non-ion-conducting materials wherein at least one of the one or more non-ion-conducting materials forms a layer;
wherein the non-ion-conducting material of the border region overlaps the ion-conducting polymeric material of the central region by 0 to 10 mm in an overlap region.

BRIEF DESCRIPTION OF THE DRAWINGS

The invention will be further described with reference to the drawings, which are intended to be purely illustrative and not limiting of the invention.
FIG. 1 is a plan view of a membrane of the invention.
FIG. 2a is a side view of a membrane of the invention and FIGS. 2b and 2c show an expanded view of the overlap region and FIG. 2d is an expanded view when there is no overlap region.

DETAILED DESCRIPTION OF THE INVENTION

Figure 3A:
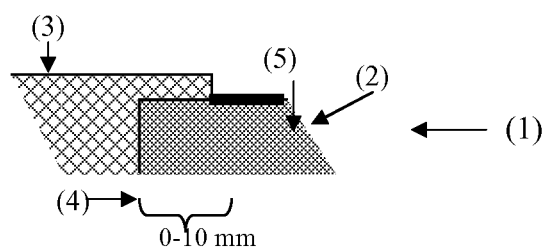
FIGS. 3a and 3b show an expanded side view of part of a catalyst coated membrane of the invention wherein an overlap region is present.

The central region comprises one or more layers of ion-conducting polymeric material and corresponds to the electrochemically active region when used in an electrochemical cell. When two or more layers are present in the central region, each layer may be the same or a different ion-conducting polymeric material. Suitable ion-conducting polymeric materials include: proton-conducting polymers or anion-conducting polymers, such as a hydroxyl anion-conducting polymer. Examples of suitable proton-conducting polymers include perfluorosulphonic acid ionomers (PFSA) (e.g. Nafion® (E.I. DuPont de Nemours and Co.), Aciplex® (Asahi Kasei), Aquivion™ (Solvay Solexis SpA), Flemion® (Asahi Glass Co.), Fumion® F-series (FuMA-Tech GmbH)), or ionomers made from hydrocarbon polymers (e.g. Fumion® P-series based on polyarylene sulphonic acid (FuMA-Tech GmbH) or phosphoric acid impregnated polybenzimidazole. Examples of suitable anion-conducting polymers include A901 made by Tokuyama Corporation and Fumasep FAA from FuMA-Tech GmbH.

The ion-conducting polymeric material may contain a reinforcement, typically wholly embedded within the ion-conducting polymer material, to provide improved mechanical properties such as increased tear resistance and reduced dimensional change on hydration and dehydration. Examples of reinforcements used include webs having a node and fibril structure, often formed by inverse phase segregation and subsequent stretching, electrospun webs and non-woven fibre webs. The preferred reinforcement may be based on, but not exclusively, a porous web or fibres of a fluoropolymer such as polytetrafluoroethylene (PTFE), as described in U.S. Pat. No. 6,254,978, EP 0814897 and U.S. Pat. No. 6,110,330, or polyvinylidene fluoride (PVDF), or alternative-materials—such as PEEK, polyethylene or polyimide-based fibres.

The border region consists of one or more non-ion-conducting materials wherein at least one of the one or more non-ion-conducting materials forms a layer (or film). When two or more layers (or films) of non-ion-conducting material are present, each layer may be the same or a different non-ion-conducting material. The non-ion-conducting material may be a polymeric material selected from the group consisting of thermoplastic, thermoset or cross-linked polymers, rubber, elastomers or thermoplastic elastomers. Specific examples of materials that may be used in the border region include: (i) hydrocarbon polymers; (ii) fluorocarbon polymers; (iii) rubbers (natural or synthetic) including elastomers and thermoplastic elastomers (TPE); (iv) thermoset (crosslinked/cured or polymerised (e.g. reaction of monomers, oligomer) by heat, chemical reaction, radiation such as UV or electron beam or other radiation source, or humidity, or by polymerisation). Specific examples of such materials that may be used will be known to those skilled in the art.

When three or more layers of non-ion-conducting material are present in the border region, one or more of these layers may be an adhesive layer to assist in bonding of the layers. The adhesive layer(s) may be selected from the group consisting of: thermoplastics or resins (e.g. hydrocarbon polymers, fluorocarbon polymers); rubbers (natural or synthetic) including elastomers, thermoplastic elastomers (TPE); pressure sensitive adhesives, hotmelt adhesives; and thermoset (crosslinked/cured or polymerised (e.g. reaction of monomers, oligomer) by heat, chemical reaction, radiation such as UV or electron beam or other radiation source, or humidity, or by polymerisation).

The border region may also comprise a non-ion-conducting reinforcing structure, for example, polymeric webs having a node and fibril structure, often formed by inverse phase segregation and subsequent stretching; or inorganic or polymeric electrospun webs, non-woven fibre webs, woven fibre webs or chopped fibres or glass fibres; or a particulate filler (e.g. carbon black or fumed silica).

A compliant (or gasket) layer may be located on one or both planar surfaces of the border region. The compliant layer is a layer that is able to deform when subjected to a load or force. The deformation is preferably not permanent and when the load or force is removed, the compliant layer will return to its undeformed state. The purpose of the compliant layer is to transfer the force between the surface of the border region and the surfaces of the fuel cell plates when part of a fuel cell; it also fills the space or uneven surface between the border region and the fuel cell plates and prevents leakage while under compression. The compliant layer may be applied to all or part of the outer surfaces of the border region. The compliant layer may be selected from the group consisting of rubber (natural or synthetic) including elastomers and thermoplastic elastomers (TPE). Specific examples of materials that may be used in the compliant layer include (i) rubbers (natural or synthetic) include elastomers, thermoplastic elastomers (TPE); and (ii) thermoplastics or resins. The compliant layer may also be reinforced with particulate fillers (e.g. carbon black, fumed silica), which will adjust its hardness/resilience.

Suitably, the non-ion-conducting material of the border region overlaps the ion-conducting polymeric material of the central region by 0 to 5 mm, more suitably 0 to 2 mm, more suitably 0 to 1.5 mm, preferably 0 to 1 mm and most preferably 0 mm (i.e. there is no overlap and therefore no overlap region), in an overlap region. In one embodiment, the amount by which the border region overlaps the central region is the same around the entire perimeter of the overlap region. In an alternative embodiment, the amount by which the border region overlaps the central region is variable around the perimeter of the overlap region; for example at some points the overlap may be 0 mm while at other points the overlap may be as much as 10 mm. Particularly at corner regions, the overlap may vary due to the positioning of manifold (porting) sites.

When the border region overlaps the central region, the overlap may occur on one face only of the ion-conducting polymeric material of the central region, or the border region may overlap the ion-conducting polymeric material of the central region on both faces, i.e. the border region encapsulates the ion-conducting polymeric material of the central region.

The border region may be adhesively or cohesively bonded to the central region. By 'adhesively bonded' is meant that an adhesive is applied to the relevant portion of one or both of the central and/or border region and the joint is formed by holding the two components (central and border region) together while the adhesive cures and/or hardens to develop structural properties, forming a bond to the surface of both the central and border region. By 'cohesively bonded' is meant that the central and border regions are held together by an intermolecular attraction between the two components and does not require the presence of a third component (e.g. an adhesive). Such an intermolecular reaction is typically achieved by heating the regions to be bonded.

The membrane of the invention may be manufactured by a number of different methods depending on the type of non-ion-conducting materials used in the border and overlap regions. In general, a film comprising one or more layers of the ion-conducting material is formed. The non-ion-conducting material is applied to form the border and overlap regions around the periphery of the ion-conducting polymeric material of the central region, either by, for example printing (screen, transfer, gravure, ink jet, etc.), moulding, extrusion, casting, dipping, brushing, spraying or jetting or by powder coating, to form the desired configuration.

In an alternative method, a film comprising one or more layers of non-ion-conducting material is made and cut into a 'picture frame' shape. The picture frame is then welded, fused, adhered or laminated to the edges of a film of one or more layers of the ion-conducting polymeric material to form the desired configuration. Picture frames of one or more layers of non-ion-conducting material may be applied to both faces of the central region of ion-conducting material to create a border region which encapsulates the ion-conducting polymeric material of the central region. This alternative method of making the membrane lends itself very conveniently to high volume manufacturing of membranes on a continuous manufacturing basis.

In one embodiment of the invention, a single reinforcement extends throughout both the central and border regions of the membrane. A single reinforcement comprising a woven, non-woven or microporous layer extending throughout both the central and border regions of the membrane may be used to impart increased mechanical strength and durability to the membrane. This structure may be formed by impregnating, moulding, casting or depositing (spraying, jetting or printing) the non-ion-conducting material and ion-conducting polymeric material into the appropriate parts of the reinforcement to form the border, overlap and central regions.

The membrane of the invention may be used in any electrochemical device requiring an ion-conducting membrane. Accordingly, a further aspect of the invention provides an electrochemical device comprising a membrane as hereinbefore described. Alternatively, there is provided the use of a membrane as hereinbefore described in an electrochemical device. In a preferred embodiment of the invention, the membrane is used in a fuel cell. Thus further aspects of the invention provide components of a fuel cell, wherein the components comprise a membrane of the invention.

In a further embodiment of the invention, an electrocatalyst layer may be provided on one or both faces of the central region to provide a catalyst-coated membrane. The electrocatalyst layer covers the entire central region of the membrane, such that the whole of the central region becomes the electrochemically active area. Although it is the intention that the entire central region of the membrane is covered with electrocatalyst, in certain circumstances there may be a small area of the edge of the central region which does not have electrocatalyst. Such a catalyst-coated membrane is still within the scope of the present invention. The electrocatalyst layer may further extend into the overlap region by up to 10 mm, or where there is no overlap region (the overlap being 0 mm) into the border region; however, the electrocatalyst layer in the overlap region is not electrochemically active and will not partake in an electrochemical reaction. If the electrocatalyst layer extends into the overlap region, the electrocatalyst layer is present on the exposed surface of the non-ion-conducting material. The electrocatalyst layer comprises an electrocatalyst, which may be a finely divided unsupported metal powder, or may be a supported catalyst wherein small metal particles are dispersed on supports such as electrically conducting particulate carbon materials. The electrocatalyst metal is suitably selected from
  (i) the platinum group metals (platinum, palladium, rhodium, ruthenium, iridium and osmium),
  (ii) gold or silver,
  (iii) a base metal,
or an alloy or mixture comprising one or more of these metals or their oxides. The preferred electrocatalyst metal is platinum, which may be alloyed with other precious metals or base metals. If the electrocatalyst is a supported catalyst, the loading of metal particles on the carbon support material is suitably in the range 10-90 wt %, preferably 15-75 wt % of the weight of resulting electrocatalyst.

The electrocatalyst layer may suitably comprise other components, such as ion-conducting polymeric material, which is included to improve the ionic conductivity within the layer.

A still further embodiment of the invention provides a MEA comprising a membrane or a catalyst-coated membrane as hereinbefore described. The MEA may be made up in a number of ways including, but essentially comprises:
  (i) a membrane of the invention having a central region, a border region and an overlap region wherein the border region overlaps the central region by 0 to 10 mm;
  (ii) two electrocatalyst layers (as hereinbefore described), one on each face of the central region and optionally extending into the overlap/border region;
  (iii) two gas diffusion layers (one anode and one cathode), one on each electrocatalyst layer.

The MEA may be constructed either using a CCM (catalyst coated membrane) route, wherein the electrocatalyst layers are first applied to the membrane and subsequently combined with the gas diffusion layers, or using a CCDL (catalyst coated diffusion layer) route, wherein the electrocatalyst layers are first applied to the gas diffusion layers and subsequently combined with the membrane, or using a combination of the two (i.e. one side of the MEA uses the CCM route and the other uses the CCDL route). If the MEA is formed using the CCDL route or a combination of the CCM and CCDL route, the electrocatalyst layer on the CCDL may be of the same area or of greater area than the central region of the membrane. If greater than the central region, similar dimensions apply as for the CCM described above.

An MEA comprising a membrane of the invention may provide one or more advantages over an MEA comprising a conventional membrane. For example: the non-ion conducting material of the border region is preferably a more rigid and mechanically stable material than the ion-conducting polymeric material of the central region. This provides for a rigid border region around the periphery of the MEA on which the MEA can be sealed and provide a gas tight seal and which may help with the subsequent assembly processes in which current issues concerning the handling and placement of component materials will be overcome. Furthermore, the presence of the border region will prevent water being drawn away from the ion-conducting polymeric material of the central region of the membrane and so the central region will not dry out and lose performance. In conventional MEAs where the ion-conducting polymeric material extends to the edge of the MEA there can be leakage of water out of the border region and drying of the membrane in the electrochemically active region. As the ion-conducting polymeric material in the electrochemically active region relies on the presence of water to function effectively, any drying out of the membrane will significantly decrease performance. Furthermore, there is minimal wastage of expensive ion-conducting polymeric material being employed in non-electrochemically active regions of the MEA.

The anode and cathode gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc, or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

The membrane, catalyst-coated membrane or MEA of the invention may further comprise an additive. The additive may be present internally within the membrane, catalyst-coated membrane or MEA or in the case of the catalyst-coated membrane or MEA, may be present at one or more of the interfaces between the various layers and/or within one or more of the layers.

The additive may be one or more selected from the group consisting of hydrogen peroxide decomposition catalysts, radical scavengers, free radical decomposition catalyst, self regenerating antioxidant, hydrogen donors (H-donor) primary antioxidant, free radical scavenger secondary antioxidant, oxygen absorbers (oxygen scavenger). Examples of these different additives may be found in WO2009/040571 and WO2009/109780. A preferred additive is cerium dioxide (ceria).

A yet further aspect of the invention provides a fuel cell comprising a membrane, a catalyst-coated membrane or a MEA as hereinbefore described. In a preferred embodiment of the invention, the fuel cell is a PEM fuel cell.

All of the embodiments described for PEM fuel cells apply equally to MEAs for PEM electrolysers. In these PEM electrolysers, a voltage is applied across the membrane electrode assemblies such that water supplied to the device is split into hydrogen and oxygen, at the cathode and anode respectively. The MEAs may require different catalyst components to a PEM fuel cell, such as Ir and Ru based materials at the anode, but are otherwise very similar in construction to MEAs used for fuel cells.

FIG. 1 shows a plan view of a membrane of the invention. The membrane (1) comprises a central region (2) comprising an ion-conducting polymeric material and a border region (3) which creates a frame around the central region (2) and which comprises a non-ion-conducting material. The non-ion-conducting material of the border region (3) may overlap the ion-conducting polymeric material of the central region (2) by 0 to 10 mm to create an overlap region (4) which comprises both ion-conducting polymeric material and non-ion-conducting material. The ion-conducting polymeric material and non-ion-conducting material are adhesively or cohesively bonded.

FIG. 2a shows a side view of a membrane of the invention as described in FIG. 1 above.

FIG. 2b shows an expanded view of the overlap region (4) wherein the non-ion-conducting material of the border region (3) overlaps the ion-conducting polymeric material of the central region (2) on one face of the central region (2) only.

FIG. 2c shows an expanded view of the overlap region (4) wherein the non-ion-conducting material of the border region (3) overlaps the ion-conducting polymeric material of the central region (2) on both faces of the central region (2).

FIG. 2d shows an expanded view wherein the non-ion-conducting material of the border region (3) does not overlap the ion-conducting polymeric material of the central region (2) and therefore there is no overlap region (the overlap is 0 mm).

FIG. 3a shows a side view of part of a catalyst coated membrane of the invention. A central region (2) comprises an ion-conducting polymeric material and a border region (3) comprises a non-ion-conducting material. The non-ion-conducting material in the border region (3) overlaps the ion-conducting polymeric material in the central region (2) on at least one face by up to and including 10 mm to create an overlap region (4). An electrocatalyst layer (5) is applied to at least one face of the central region, the electrocatalyst layer (5) being of the same area as the central region (2) and covers the entire central region (2).

Figure 3B:
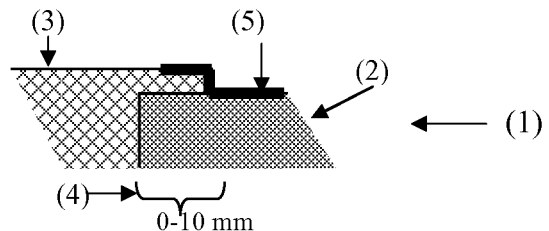

FIG. 3b shows a side view of part of a catalyst coated membrane similar to that described with respect to FIG. 3a. However, the electrocatalyst layer (5) is larger in area than the central region (2) and extends into the overlap region (4) by up to an including 10 mm. In FIG. 3b, the electrocatalyst layer (5) is present on the outer face of the ion-conducting polymeric material of the central region (2) and the non-ion-conducting material of the border region (3). The electrocatalyst layer (5) which extends into the overlap region (4) does not take part in any electrochemical reaction, when the catalyst coated membrane is incorporated into a fuel cell.

Figure 4A:
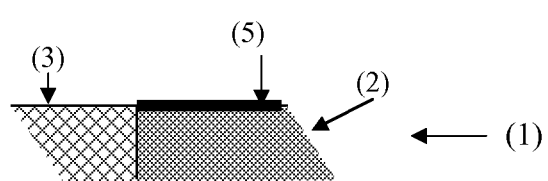
FIGS. 4a and 4b show an expanded side view of part of a catalyst coated membrane of the invention wherein no overlap region is present.
Figure 4B:
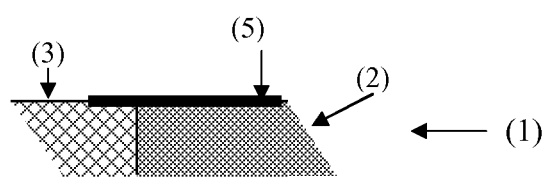

FIGS. 4a and 4b show a side view of part of a catalyst coated membrane of the invention having a central region (2) comprising an ion-conducting polymeric material and a border region (3) comprising a non-ion-conducting material. The non-ion-conducting material of the border region (3) does not overlap the ion-conducting polymeric material of the central region (2) such that there is no overlap region. In FIG. 4a, the electrocatalyst layer (5) is of the same area as the central region (2), such that the central region (2) is completely covered by the electrocatalyst layer (5). In FIG. 4b, the electrocatalyst layer (5) is larger in area than the central region (2), such that a portion of the border region (3) is covered by electrocatalyst layer (5). Suitably, the electrocatalyst layer (5) extends into the border region (3) by up to, and including, 10 mm. The electrocatalyst layer (5) which extends into the border region (3) does not take part in any electrochemical reaction, when the catalyst coated membrane is incorporated into a fuel cell.

EXAMPLE

Membranes having a central region comprising an ion-conducting polymeric material and a border region comprising a non-ion-conducting material were prepared by the following method:

Films of non-ion-conducting material were cut into a picture frame shape from a planar sheet of the non-ion-conducting material. The non-ion-conducting film was either a 3-layered sheet comprising 12 μmEVA (ethylenevinylacetate)/12 μmPET (polyethyleneterephthalate)/12 μmEVA or a 2-layered sheet comprising 12 μmEVA/12 μmPET. The internal dimension of the window of the frames was 45 mm by 45 mm and the external dimension 70 mm by 70 mm.

Two picture-frame shaped films of each of the non-ion-conducting materials were placed either side of an expanded polytetrafluoroethylene (ePTFE) reinforced polyfluorosulphonic acid (PFSA) ion-conducting polymeric material (either 30 μm or 17 μm thick). In the case of the 2-layered non-ion-conducting sheet, the frames were positioned such that the EVA layers faced each other. The dimension of the PFSA sheet were slightly larger than the opening in the frames of the non-ion-conducting polymeric material, such that the non-ion-conducting material overlapped the PFSA ion-conducting material by an average of 3 mm on each side.

The assembly was laminated under pressure and elevated temperature, such that the EVA layer in the non-ion-conducting material flowed so that the edges of the ion-conducting PFSA material were completely encompassed. A membrane having a central region, a border region and an overlap region was obtained.

The invention claimed is:

1. A membrane, suitable for use in a fuel cell, wherein the membrane comprises:
   (a) a central region comprising an ion-conducting polymeric material; and
   (b) a border region which creates a frame around the central region and which consists of one or more non-ion-conducting material wherein at least one of the one or more non-ion-conducting materials forms a layer,
   wherein the non-ion-conducting material of the border region overlaps the ion-conducting polymeric material of the central region by 0 to 10 mm in an overlap region, and
   wherein a single reinforcement extends throughout both the central and border regions of the membrane.

2. A membrane according to claim 1, wherein the non-ion-conducting material of the border region overlaps the ion-conducting polymeric material of the central region on one face only.

3. A membrane according to claim 1, wherein the non-ion-conducting material of the border region overlaps the ion-conducting polymeric material of the central region on both faces.

4. A catalyst-coated membrane comprising a membrane according to claim 1 and an electrocatalyst layer provided on one or both faces of the central region of the membrane.

5. A catalyst-coated membrane according to claim 4, wherein the electrocatalyst layer extends into the overlap region by up to 10 mm.

6. A membrane electrode assembly comprising a catalyst-coated membrane according to claim 4.

7. A fuel cell comprising a catalyst-coated membrane according to claim 4.

8. A membrane electrode assembly comprising a membrane according to claim 1.

9. A fuel cell comprising a membrane electrode assembly according to claim 8.

10. A fuel cell comprising a membrane according to claim 1.

11. The membrane according to claim 1, wherein the non-ion-conducting material of the border region overlaps the ion-conducting polymeric material of the central region by 0 mm such that there is no overlap region.

12. The membrane according to claim 1, wherein the ion-conducting polymeric material of the central region is a proton conducting polymer selected from the group consisting of perfluoroshulphonic acid ionomers, ionomers made from hydrocarbon polymers and phosphoric acid impregnated polybenzimidazole.

13. The membrane according to claim 1, wherein the single reinforcement is formed from a polymer selected from the group consisting of fluoropolymer, polyvinylidene fluoride, PEEK, polyethylene and polyimide.

14. The membrane according to claim 1, wherein the border region is formed from a polymeric material selected from the group consisting of thermoplastic polymers, thermoset polymers, cross-linked polymers, rubber, elastomers and thermoplastic elastomers.

15. The membrane according to claim 1, wherein the border region is formed from three of more layers of non-ionic conducting material including an adhesive layer.

16. The membrane according to claim 1, wherein the border region includes a gasket on one or both planar surfaces of the border region.

17. The membrane according to claim 1, wherein the single reinforcement comprises a woven layer.

18. The membrane according to claim 1, wherein the single reinforcement comprises a non-woven layer.

19. The membrane according to claim 1, wherein the single reinforcement comprises a microporous layer.

* * * * *